Aug. 31, 1926.
D. T. BLACK
1,598,264
BLOTTING PAD
Filed Oct. 9, 1925
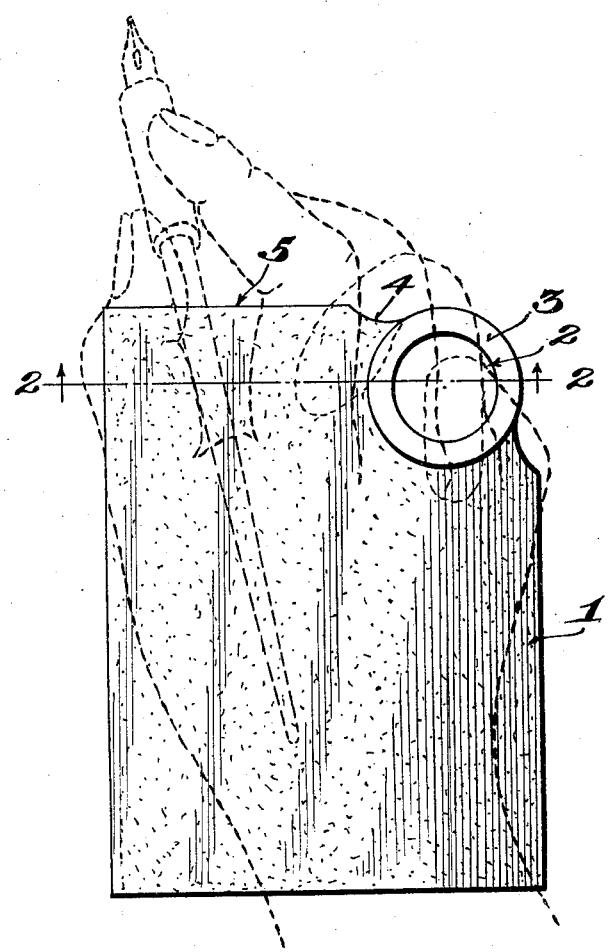
Inventor
David T. Black
By Joseph A. Miller
Attorney Patented Aug. 31, 1926.

1,598,264

UNITED STATES PATENT OFFICE.

DAVID T. BLACK, OF PROVIDENCE, RHODE ISLAND.

BLOTTING PAD.

Application filed October 9, 1925. Serial No. 61,443.

This invention relates to certain new and useful improvements in blotting pads.

The primary object thereof is to provide a blotting pad which is formed so as to be connected to the hand of the writer during writing, and which can be brought into blotting position by mere shifting of the hand and therewith of the pad toward and over the writing.

The invention aids to provide a simple and inexpensive form of blotting pad, which can be easily and quickly manufactured and likewise applied to and removed from its operative position on the hand of the writer.

Briefly the invention proposes a blotting pad which has a finger receiving opening through which a finger of the writer can be projected, so as to hold the pad against the palm of the hand, and in such position so as not to interfere with free or normal holding and use of the pen in writing.

Figure 1 is a plan view of the invention, showing the manner of use in dotted lines, and Figure 2 is a section on line 2—2 of Figure 1.

In proceeding in accordance with the present invention, a blotting pad is employed and which at one corner thereof is formed with an opening 2. The opening 2 may be reinforced on each side thereof by means of rings 3 of paper or other material, which rings may be secured in position by means of adhesive. A cut-out portion 4 is formed in the front end edge of the pad so as to provide a concave finger receiving seat.

In use, the little finger is projected through the opening 2 while the finger next to the little finger is, with the latter, engaged with the underside of the pad thereby to hold the latter against the palm of the hand. The middle finger, the index finger, and the thumb project beyond the front edge 5 of the pad and grip the pen in the usual writing position thereof. It will thus be seen that the pad not only forms a rest for the palm of the hand and wrist of the writer so as to prevent such parts of the hand from soiling the paper on which the writing is being placed, but in addition the hand and therewith the pad can be easily and quickly moved toward the writing and the latter blotted by merely pressing the wrist or palm of the hand downwardly against the pad.

The invention is of particular benefit to bookkeepers and others who are constantly engaged in writing, and upon reversal can, as is obvious, be used as well by left-handed writers.

Having thus described my invention what I claim as new and desire to secure by Letters Patent is:—

1. In a blotting pad, a blotting body having an opening at one corner thereof to receive the little finger of the writer and having a concave seat to receive the finger next to the little finger, so as to enable said fingers to engage over said corner and with the under face of the body to hold the latter engaged beneath the palm and wrist of the writer, and to enable the pad to be moved to blotting position by pressure of the palm thereon, said body having its front edge formed to enable the thumb and remaining fingers to project therebeyond so as to hold a pen in writing position.

2. A blotting pad composed of a sheet of blotting paper of a size to engage beneath the palm of the user's hand and having an opening through the sheet to receive a finger therethrough, said opening being located adjacent an edge of the sheet so as to enable the finger to engage the under face of the sheet so as to hold the latter engaged with the palm and to enable the pad to be moved to blotting position by pressure of the palm thereon.

3. A blotting pad composed of a sheet of blotting paper of a size to engage beneath the palm of the user's hand and having an opening therein extending transversely of the plane of the sheet to receive a finger therethrough, said opening being located adjacent a corner of the sheet so as to enable the finger to engage the under face of the sheet thereby to hold the latter engaged with the palm and to enable the pad to be moved to blotting position by pressure of the palm thereon.

4. In a blotting pad, a blotting body having an opening at one corner thereof to receive the little finger of the writer and having a concave seat on either side of said opening to receive the finger next to the little finger, so as to enable said fingers to engage over said corner and with the under face of the body to hold the latter engaged beneath the palm and wrist of the writer and to enable the pad to be moved to blotting position by pressure of the palm thereon, said body having its front edge formed to enable the thumb and remaining fingers to project therebeyond so as to hold a pen in writing position.

In testimony whereof I have signed my name to this specification.

DAVID T. BLACK.